US011873800B2

(12) United States Patent
Immig

(10) Patent No.: US 11,873,800 B2
(45) Date of Patent: Jan. 16, 2024

(54) ENERGY CONVERSION UNIT, ENERGY CONVERSION ASSEMBLY, ENERGY CONVERSION SYSTEM AND NETWORK

(71) Applicant: Mario Immig, Bad Kreuznach (DE)

(72) Inventor: Mario Immig, Bad Kreuznach (DE)

(73) Assignee: Mario Immig, Bad Kreuznach (DE)

( * ) Notice: Subject to any disclaimer, the term of this patent is extended or adjusted under 35 U.S.C. 154(b) by 0 days.

(21) Appl. No.: 17/701,521

(22) Filed: Mar. 22, 2022

(65) Prior Publication Data
US 2022/0341395 A1  Oct. 27, 2022

(30) Foreign Application Priority Data

Apr. 23, 2021 (EP) .................................... 21170223

(51) Int. Cl.
*F03D 9/46* (2016.01)
*F03D 9/32* (2016.01)
*B60L 53/52* (2019.01)
*F03D 1/04* (2006.01)

(52) U.S. Cl.
CPC ................ *F03D 9/46* (2016.05); *B60L 53/52* (2019.02); *F03D 1/04* (2013.01); *F03D 9/32* (2016.05); *F05B 2240/13* (2013.01); *F05B 2240/9113* (2013.01); *F05B 2240/94* (2013.01)

(58) Field of Classification Search
CPC . F03D 9/46; F05B 2240/13; F05B 2240/9113
See application file for complete search history.

(56) References Cited

U.S. PATENT DOCUMENTS

| 5,272,378 A * | 12/1993 | Wither ...................... F03D 9/46 290/55 |
| 7,427,173 B2 * | 9/2008 | Chen ......................... B60L 8/00 290/55 |
| 2009/0250936 A1 | 10/2009 | Souryal |

(Continued)

FOREIGN PATENT DOCUMENTS

| CN | 107100791 A * | 8/2017 | |
| CN | 107100791 A | 8/2017 | |
| DE | 10303134 A1 * | 7/2004 | ............. F03D 13/20 |

(Continued)

OTHER PUBLICATIONS

Extended European Search Report for Application No. EP 21 17 0223.8 dated Sep. 23, 2021, 6 pgs.

*Primary Examiner* — Courtney D Heinle
*Assistant Examiner* — Danielle M. Christensen
(74) *Attorney, Agent, or Firm* — Seed IP Law Group LLP

(57) ABSTRACT

An energy conversion unit for converting wind energy into electrical energy includes at least one rotor with a substantially horizontal axis of rotation, having a plurality of rotor blades extending radially to the axis of rotation, wherein the rotor has a flow direction which corresponds to the axis of rotation, a wall to be arranged next to a traffic route for vehicles which can move on the traffic route in a direction of travel and the movement of which causes an air flow, wherein the wall has a receptacle in which the rotor is arranged, wherein the receptacle has an opening on a side surface of the wall to be directed towards the traffic route, and wherein the axis of rotation of the at least one rotor is oriented substantially perpendicular to the direction of travel.

13 Claims, 6 Drawing Sheets

(56) References Cited

U.S. PATENT DOCUMENTS

2013/0251526 A1 9/2013 Hernandez
2018/0226860 A1 8/2018 Glatfelter et al.

FOREIGN PATENT DOCUMENTS

| | | | |
|---|---|---|---|
| DE | 102010049021 A1 * | 7/2011 | .......... B60L 11/1824 |
| DE | 10 2018 001 424 A1 | 8/2019 | |
| EP | 1 681 462 A2 | 7/2006 | |
| GB | 2 438 630 A | 12/2007 | |
| GB | 2465219 A | 5/2010 | |
| JP | 2001-55971 A | 2/2001 | |
| KR | 20070115172 A * | 12/2007 | |
| WO | 2020/157219 A1 | 8/2020 | |

* cited by examiner

ENERGY CONVERSION UNIT, ENERGY CONVERSION ASSEMBLY, ENERGY CONVERSION SYSTEM AND NETWORK

BACKGROUND

Technical Field

The subject-matter of the present disclosure is an energy conversion unit, an energy conversion assembly, and an energy conversion system for converting wind energy into electrical energy. The energy conversion unit is adapted and arranged to catch air flows caused by the movement of vehicles on a traffic route, such as an airstream or a thrust flow, and to generate electrical energy therefrom. The present disclosure also relates to a network which comprises an energy conversion unit, an energy conversion assembly, and/or an energy conversion system.

Description of the Related Art

GB 2 465 219 A describes an airstream turbine which is arranged below a traffic route. The vehicles driving on the traffic route generate an airstream which is partly directed through a passable grid in the traffic route. A Vidguet turbine, similar to a windmill, is accommodated in a cavity underneath the grid. A deflector plate can be provided in the cavity in order to guide the airstream in the direction of rotation of the turbine wheel. Nevertheless, a portion of the airstream inevitably works against the direction of rotation of the turbine. There is a particularly serious reduction in efficiency in that the majority of the airstream escapes unused above the traffic route, so that only a relatively small proportion of the airstream acts on the turbine. At the same time, the cavity acts as a dirt trap which impairs the operational safety of the airstream turbine increases the amount of maintenance required. The grid disrupts the flat surface of the traffic route and can be a significant driving hazard for two-wheeled vehicles for example.

In WO 2020/157219 A1 an airstream turbine is described which can be placed around the mast of a street light in the form of a half-shell, for example for operating the latter. The turbine blades are arranged around the mast and extend vertically parallel to the direction of rotation. This construction causes a large resistance to rotation. This construction causes a large resistance to rotation. The mast can be arranged between opposite traffic lanes on the traffic route. However, the airstreams of vehicles driving in opposite directions then cancel each other out. The majority of the airstream blows past the turbines. Provided the airstream hits the turbine, on the one hand turbine blades are blown in the direction of rotation and on the other hand and on the other hand turbine blades are also blown in a direction opposite the direction of rotation. In this way the rotation of the turbine is reduced. With the airstream turbine described in WO 2020/157219 A1, only very little wind energy can be exploited.

In EP 1 681 462 A2, a wind generator is described which is arranged on a road or railway line suspended in a tunnel or on a bridge in front of the side or roof surface. The wind generator is to be fitted with a Savonius turbine for capturing the airstream and generating electrical energy therefrom. The elongated structure parallel to the axis of rotation causes a large rotational resistance. The majority of the airstream blows past the turbines. The airstream hitting the turbine partly acts in the direction of rotation but also against the direction of rotation which considerably restricts the wind energy yield. The wind energy yield is low and the efficiency is also low.

U.S. Pat. No. 7,427,173 B2 relates to a turbine on the hard shoulder or central reservation for traffic routes, which are driven on in opposite directions on both sides of the central reservation. Along the traffic route there is barrier wall which extends between respectively adjacent airstream turbines. The turbines extend parallel to the axis of rotation in vertical direction and thereby have a relatively high rotational resistance. The airstream turbines are surrounded by housings which each have an inlet opening, and outlet opening and a central opening with respect to each adjacent traffic lane. With this configuration, too, the majority of the airstream blows past the rotor along the outside of the barrier wall or upwards. The relatively small proportion of the airstream, which hits the turbine, acts both in and against the direction of rotation. This results in very low efficiency in terms of the theoretically possible wind yield.

Thus, there is accordingly a need to provide energy conversion units, energy conversion assemblies and/or energy conversion systems for converting wind energy into electrical energy as well as networks with the same, which are no longer affected by the disadvantages of the prior art. There is also a need to provide energy conversion units, energy conversion assemblies and/or energy conversion systems as well as networks with the same, which ensure highly efficient conversion of wind energy, in some other cases starting from wind currents which are caused by the movement of vehicles, such as an airstream or a thrust flow.

BRIEF SUMMARY

Thus, according to a first aspect of the present disclosure, an energy conversion unit for converting wind energy into electrical energy is provided which comprises at least one rotor with a substantially horizontal axis of rotation and a wall to be arranged adjacent to a traffic route for vehicles, wherein the wall has a receptacle in which the rotor is arranged. Vehicles can move on a traffic route in a direction of travel. The movement of vehicles creates an air flow, which is referred to here as an airstream. A vehicle can be a road vehicle, such as a passenger car, a truck or the like, for driving on road traffic routes. Alternatively or in addition, a vehicle can be in the form of a rail vehicle, such as a train, for example a magnetic levitation train, a high-speed train or a freight train, for traveling on rail traffic routes. According to a further alternative it is conceivable that a vehicle is an aircraft, such as a propeller-driven or jet-powered aircraft, which is configured to travel on a runway, for example for take-off and landing.

The rotor comprises a plurality of rotor blades extending radially to the axis of rotation. The number of rotor blades can be variable. For example, a number of 2, 3, 4, 5 or more rotor blades can be provided. Alternatively or in addition, the rotor diameter can be variable, for example as described below. Furthermore, the rotor has an inflow direction which corresponds with the axis of rotation, in some cases is parallel to the axis of rotation. In comparison to this, with the aforementioned Savonius turbine known from the prior art the inflow direction would be perpendicular to the axis of rotation. A person skilled in the art understands that the aerodynamic cross-section or the cross-sectional profile of the rotor blades is determined with respect to the predetermined inflow direction.

The wall has a side surface facing towards the traffic route. On the side surface facing the traffic route, the receptacle in the wall has an opening. In some cases, the area of the opening in proportional to the size of the side surface of the wall. Thus, for example the area of the opening can be at least 25%, in some cases at least 30%, in some other cases at least 50% of the size of the side surface of the wall or wall section in which the receptacle is provided. The axis of rotation of the at least one rotor is oriented substantially perpendicularly to the direction of travel. In some cases, the axis of rotation of the at least one rotor can be orthogonal to the direction of travel. In some cases the side surface of the wall extends substantially parallel to the traffic route, in some cases the direction of travel of the traffic route. Alternatively, in some cases the side surface of the wall is oriented at an oblique angle in relation to the direction of travel. It is conceivable that the side surface of the wall is arranged in relation to the direction of travel at an angle in the range of 0° to 90°, in some cases at an angle of at least 30°, in some other cases at least 45°, in some even other cases at least 60°. According to one embodiment the side surface of the wall can be arranged in relation to the direction of travel at an angle in the range of 75° to 100°, in some cases in the range of 80° to 95°.

With an energy conversion unit according to the first aspect of the present disclosure it can be ensured that the airflows caused by the movement of vehicles, such as the airstream, is received in a substantially horizontal direction, in some cases in the inflow direction corresponding to the direction of the axis of rotation of the rotor. At the same time, the usable air flow volume flow can be massively increased.

BRIEF DESCRIPTION OF THE SEVERAL VIEWS OF THE DRAWINGS

Further features and advantages of the present disclosure arise from the following description, in which exemplary embodiments of the present disclosure are explained by way of example with reference to schematic drawings, without thereby limiting the invention. Therein

DETAILED DESCRIPTION

Figure 1:
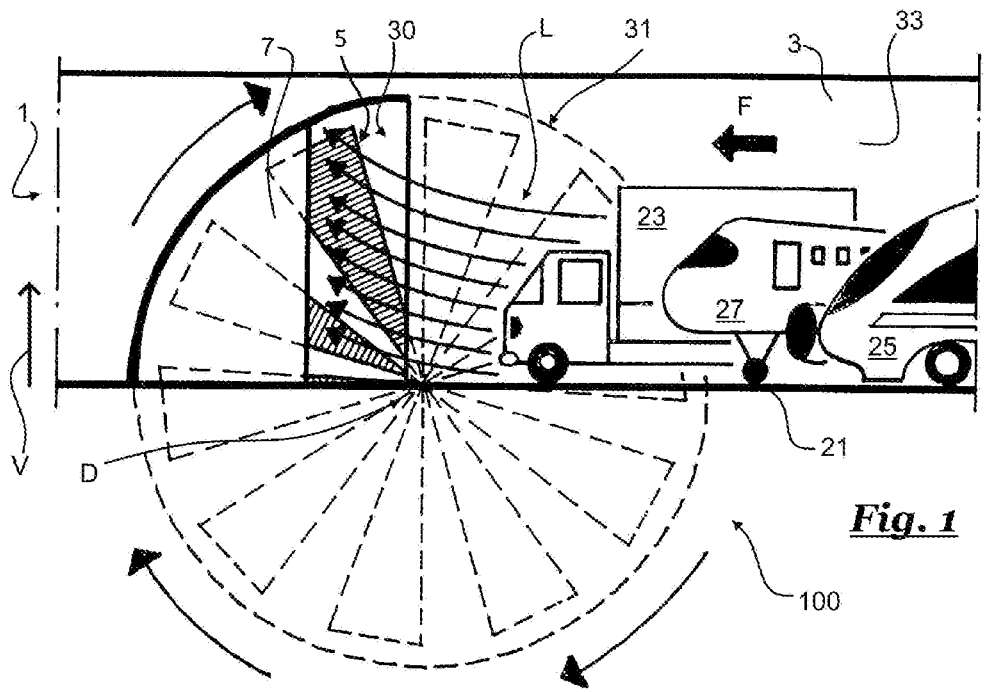
FIG. 1 is a schematic side view of an energy conversion unit according to the present disclosure.

According to an expedient embodiment of the present disclosure the wall has a main direction of extension, which corresponds to the direction of travel, in some cases parallel to the direction of travel. Alternatively or in addition, the main direction of extension can be oriented perpendicular, in some cases orthogonal, to the axis of rotation of the at least one rotor. The use of the wall makes it possible to catch air flows, in some cases an airstream, and direct it to the opening and thus to the rotor, so that the entire rotor surface is exposed to the air flow so that in some other cases a full area yield can be ensured. In contrast to conventional configurations the wall prevents the majority of the air flow from blowing past the turbine. The airstream has to flow through the rotor to reduce pressure and drive it to generate electrical energy.

According to an expedient embodiment the energy conversion unit further comprises at least one tail box for guiding the air flow to the opening, wherein the tail box is mounted on the side surface of the at least one wall facing the traffic route and is in front of the wall in axial direction to the axis of rotation. The tail box is arranged along an inner circumferential edge directly adjacent to or at an only small distance of less than 10 cm, in some cases less than 5 cm, in an expedient case less than 1 cm, from the side surface of the wall. By means of the tail box air flows, in in some cases airstreams, are caught and forced in the direction of the rotor. The tail box causes a certain amount of forced flow through the rotors with the air flows created by the vehicles. By providing a tail box it is possible to prevent air flow along the inner side of the wall in the direction of travel, against the direction of travel or past the rotor at the top. In this way the usable amount of the airstream volume flow can be massively increased. Through the tail box, the efficiency of an energy conversion unit can be significantly increased. Furthermore, the tail box can cause the air flow to hit the rotor blades to a greater extent parallel to the inflow direction and thus at a more effective wind speed, which can increase the efficiency of the rotor itself.

In one development the tail box has a tail box opening directed against the direction of travel. The at least one or the plurality of guide plates extend, in some cases continuously, from the in some cases single tail box opening to the opening. In some cases, the tail box is otherwise closed from the traffic route. In some cases, the tail box comprises at least one guide plate for guiding the air flow from a tail box opening to the opening, in some cases with an air flow direction corresponding to the inflow direction in the region of the opening. The inner circumferential edge can be formed at least partly by the guide plate. The shape of the tail box or the guide plate, for example at least oblique in sections, is adapted and arranged to direct an incoming air flow in the direction of the opening. The guide plate can be in one piece or have multiple parts. It is conceivable that a tail box comprises a plurality, such as at least 4, at least 8 or at least 20 guide plates, so as to guide air flows in an approximately laminar manner from an air box opening to the opening. The guide plate can be oriented obliquely in the direction of the opening, at least partly, in some cases over the full surface, in the direction of the opening and/or can be curved continuously at least partly, in some cases over the full surface, in the direction of the opening. The tail box can comprise a plurality of guide plates, wherein one or more guide plates are configured and arranged to force an air flow upwards in vertical direction, downwards in vertical direction and/or in axial direction, in some cases corresponding to a horizontal direction, to the opening.

In one development which can be combined with the previous one, the energy conversion unit further comprises at least one apron arranged above the tail box opening, in some cases projecting obliquely, in some other cases concavely, from the tail box opening against the direction of travel, which is configured and arranged to guide an air flow to the opening, in some cases downwards in vertical direction. By means of the apron a tail box, which has a tail box height, can be provided with an enlargement of the inlet area in vertical direction upwards, in order to guide an even greater proportion of an air flow, in some cases the airstream, which flows along the side surface of the wall, through the tail box to the opening. The forced flow of the airstream or other air flows through the tail box can be further enhanced by means of an apron.

According to one development, which can be combined with the previous ones, it is provided that the tail box surrounds the opening at least partly, in some cases covers it, wherein the tail box in some cases covers the axis of rotation. In some cases, with respect to the direction of travel the inner circumferential edge of the tail box is arranged at least partly in the region of the opening. An air flow moving in the direction of travel is thus prevented by the tail box from flowing past the opening and diverted into the opening to the rotor. From the rear end of the opening in the direction of travel, the tail box can extend over a diagonal section of the opening. For example, the tail box can extend in diagonal direction against the direction of travel over at least a quarter, at least a third, at least half or at least three quarters, in some cases over the entire diagonal length of the opening, against the direction of travel.

According to another development, which can be combined with the previous ones, the tail box extends in vertical direction at least as high as the opening of the receptacle. In some cases, the height of the opening and the height of the tail box are substantially the same starting from a substantially planar ground surface. It is conceivable that a tail box is taller in vertical direction than the opening surrounded by said tail box.

According to a second aspect of the present disclosure, an energy conversion unit is provided for converting wind energy into electrical energy, which comprises at least one rotor with a substantially horizontal axis of rotation and a wall to be arranged next to a traffic route in the form of runway for aircraft, which can run on traffic route in a direction of travel and the thrust flow of which determines the air flow. The wall has a receptacle in which the rotor is arranged. The aircraft is configured to travel on the runway, for example for take-off and landing.

The rotor comprises a plurality of rotor blades extending radially to the axis of rotation. The number of rotor blades can be variable. For example, a number of 2, 3, 4, 5 or more rotor blades can be provided. Alternatively or in addition the rotor diameter can be variable, for example as described below. Furthermore, the rotor has an inflow direction which corresponds with the axis of rotation, in some cases is parallel to the axis of rotation.

The wall has a side surface facing towards the traffic route. On the side surface facing the traffic route, the receptacle in the wall has an opening. The axis of rotation of the at least one rotor is oriented corresponding, in some cases substantially parallel to the traffic route and to the direction of travel.

Due to the high speeds of the thrust flow of an aircraft an energy conversion device, which according to the second aspect of the present disclosure is configured and arranged to detect such thrust flows and to convert them into electrical energy by means of a rotor, can achieve a high degree of power extraction from the available air flows. In this way, energy amounts sufficient to supply tens of thousands of households with electricity can be obtained at a medium-sized to large airport.

An embodiment of an energy conversion unit comprises a support carriage which moves, in some cases on the traffic route, wherein the wall is secured to the support carriage. The support carriage carries the wall including the rotor arranged in the receptacle, so that a mobile energy conversion unit can be provided. The mobile energy conversion unit can be used for example for positioning in highly suitable locations at short notice and/or provisionally. For example, a vehicle trailer or a wagon that moves on rails can be used as the support carriage.

According to one development of the energy conversion unit according to the second aspect of the present disclosure with a support carriage, the support carriage is adapted and arranged to follow an aircraft along the traffic route in the form of a runway. In some cases, the support carriage can be adapted and arranged to follow the aircraft at a predetermined distance. The predetermined distance can be in the range of 10 m to 1 km. The predetermined distance can be for example at least 50 m, in some cases at least 100 m, in some other cases at least 200 m. Alternatively or in addition, the predetermined distance can be less than 2 km, in some cases less than 1 km, in some other cases less than 500 m. By having the energy conversion unit follow the aircraft, the input of kinetic wind energy from the thrust flow of the aircraft can be optimized.

In one embodiment of an energy conversion unit, the one wall has a height which corresponds at least to a vehicle height of the vehicles moving on the traffic route. A person skilled in the art is familiar with typical vehicle heights for different traffic routes. For rail traffic routes, the typical vehicle height is generally limited by the height of the overhead line. The so-called standard contact wire height can generally be between 4.50 m and 6.50 m, in some cases between 5 m and 5.50 m. For road vehicles a typical vehicle height can be in the range of 1.50 m to 5 m, in some cases 1.70 m (for passenger cars) and/or 4 m (for trucks). For aircraft, a typical vehicle height can be assumed to be a hull or wing panel height of less than 25 m, in some cases less than 20 m, in some other cases less than 10 m. By configuring the wall height to be at least as high as a vehicle height, it is possible to prevent air flows caused by the vehicles from escaping easily over the wall. In this way, it is possible to intensify the forced flow through the at least one rotor by the air flows created by the vehicles.

According to one embodiment of an energy conversion unit the wall has two opposite side surfaces. In some cases, the side surfaces are substantially plane-parallel to one another. The receptacle extends between the opposite side surfaces. The receptacle has at least one opening on a first side surface. The receptacle can have a second opening on the second side surface. In some cases, the receptacle has two openings, one of which is arranged on the two opposite side surfaces. In some cases receptacle penetrates the wall completely. The rotor is arranged inside the receptacle. In some other cases the rotor extends in its axial direction not beyond the first and/or second side surface of the wall. Alternatively or in addition, it can be provided in one embodiment that the axis of rotation of the rotor is oriented perpendicularly, in some cases orthogonally, to the side surface of the at least one wall. In this way, a compact structure can be achieved so that existing traffic routes can easily be supplemented by an energy conversion unit. The housing of the rotor in the wall prevents damage to the rotor and provides protection from dirt as well as noise.

In one embodiment of an energy conversion unit the rotor blades of the rotor have a variably adjustable inclination relative to the axis of rotation, in some cases continuously or stepwise. Due to the adjustability of the angle of inclination of the rotor blades depending on the prevailing air flow conditions the efficiency can be adjusted to an optimum degree.

In one embodiment of the energy conversion unit, the opening of the receptacle can be at least as large as the rotor arranged in this receptacle. In some cases, the rotor has a rotor radius of at least 0.5 m, in some other cases at least 1 m, in some even other cases at least 2 m. Alternatively or in addition, the rotor radius can be no more than 10 m, in some cases not more than 5 m. A rotor radius according to one embodiment can be 7.5 m for example. According to an alternative embodiment, it can be expedient for the opening to have a smaller area and/or height and/or width than the rotor arranged in the associated receptacle, for example in an embodiment in which the receptacle is arranged at least partly, in some cases underground, below the traffic route.

In addition or alternatively, in one embodiment of an energy conversion unit the opening can be part-circular. In some cases, the opening can be a quarter circle or semi-circle. A part-circular opening may be expedient in some cases in combination with a rotor arranged at least partly below the traffic route.

In some cases, the opening extends above the traffic route. In some cases the opening has a lower edge which begins approximately at the height of the traffic route or above the surface of the traffic route. By means of such an arrangement of the opening with respect to the traffic route it can be ensured that the traffic route surface acts as an additional guiding surface to bring about the enforced flow through the rotor.

In one embodiment of an energy conversion unit according to the first or second aspect of the present disclosure the energy conversion unit further comprises at least one deflector plate, which extends on an upper and/or side edge along the wall and projects obliquely, in some cases concavely, in the direction of the traffic route from the side surface. In some cases, the deflector plate can project at right angles to the direction of the traffic route from the side surface. The deflector plate extends for example on an upper edge along the wall further upwards and/or on a side edge along the wall further to the respective right or left side, beyond the extension of the wall. The deflector plate can also be referred to as a wind collector. In some cases, the deflector plate has a bend projecting downwards in vertical direction on an edge of the deflector plate facing the traffic route. In some cases, the bend extends, in some cases without interruption, along the whole length of the deflector plate. By means of the deflector plate projecting in the direction of the traffic route a funnel-like structure can be formed which guides air flows, in some cases an airstream or thrust flow to the opening. With the aid of a deflector plate, the forced flow through the rotor can be increased and thus the efficiency of the energy conversion unit enhanced. In some cases, a deflector plate can be used to prevent air flow blowing unused past the wall with the opening provided in it and the rotor-receptacle arranged behind it.

The present disclosure also relates to an energy conversion assembly, which comprises a plurality of energy conversion units as described above, in some cases a plurality of energy conversion units. The walls of the plurality of energy conversion units form a system wall and have aligning, in some cases merging side surfaces. In some cases, the side surfaces of adjacent walls (which can also be referred to as wall sections) can be joined to one another without any gaps and merge into one another. An energy conversion assembly can comprise several walls with a plurality of, in some cases at least 2, at least 3, at least 5, at least 10, at least 20 or at least 100 rotors, wherein rotors are configured and arranged to convert kinetic wind energy into rotational energy, which can be converted into electrical energy. For example, an energy conversion assembly based on an energy conversion unit according to the second aspect of the present disclosure can have 2, 3 or 4 walls with a respective rotor, wherein in some cases the number of walls can be selected according to a number of typically provided propellers or jet engines on a respective runway. Compared to a single, stand-alone energy conversion unit, an energy conversion assembly has the advantage of creating a forced flow of air through the rotors over an even larger area as a result of the movements of vehicles, so that the wind energy caught in an energy conversion assembly is greater than a corresponding number of stand-alone energy conversion units.

In one development of an energy conversion assembly based on energy conversion units with a respective deflector plate, the individual deflector plates of the individual energy conversion units form a deflector plate section, which has aligning, in some cases merging, inner sides directed towards the traffic route. In some cases, the deflector plates of the energy conversion units are joined to one another without gaps or are arranged relative to one another with a negligibly small gap distance, in some cases of less than 10 cm, in some other cases less than 5 cm, in some even other cases less than 1 cm.

The present disclosure can also relate to an energy conversion system which comprises at least one energy conversion unit as described above or at least one energy conversion assembly as described above as well as a traffic route. The traffic route can be for example a road, a railway line for rail vehicles, such as trains, or a runway for aircraft. In some cases, the wall runs at least partly, in some cases in parallel, adjacent to the traffic route. The distance between the energy conversion units, in some cases the side surface of the energy conversion unit, and a side edge of the traffic route can be less than 50 m, in some cases less than 10 m, in an expedient case less than 3 m and in a highly expedient case less than 1.50 m.

In one development of an energy conversion system, which has two traffic routes, in some cases with opposite directions of travel, the at least one energy conversion unit can be arranged between a first and second traffic route. In such an energy conversion system the receptacle has a first opening on the first side surface of the wall, which is directed towards the first traffic route. Furthermore, the receptacle has a second opening, which is directed towards the second traffic route. Alternatively, it can be provided that with an energy conversion system which is arranged between a first and a second traffic route, an energy conversion assembly is provided, in which adjacent wall sections have receptacles that are open alternately to the first or second side.

In another embodiment, the at least one energy conversion unit is adapted and arranged to receive a thrust flow of a propeller and/or jet propulsion of an aircraft in the inflow direction. In this development the traffic route is a runway and the at least one energy conversion unit is adapted and arranged so that the inflow direction of its rotor corresponds with a thrust flow of an aircraft rolling, in some cases taking off or landing, on the traffic route accordingly.

The present disclosure can also comprise a network which comprises at least one energy conversion unit described above, one energy conversion assembly described above or at least one energy conversion system described above. The network can also have at least one electrical consumer, such as a heating device, in some cases for heating the traffic route and/or access paths to the energy conversion unit. Alternatively or in addition, the network can have at least one electrical charging station for at least one vehicle in some cases an electrically operated vehicle, for example and electric train or an electrically powered road vehicle. The network can alternatively or additionally have at least one induction coil arrangement for inductively charging a vehicle on the traffic route. Alternatively or in addition the network comprises at least one power storage unit. Furthermore, alternatively or additionally, the network comprises at least one converter device for supplying the electrical energy to a power grid, such as a building power grid or a public power grid. Alternatively or in addition, the consumer may comprise at least one light and/or display, for example a traffic guidance display, or a display for information, such as advertising information. The consumer can comprise decorative lighting.

Unlike a wind energy system, which extracts energy from the naturally blowing wind via a rotor, energy is recovered by the energy conversion unit from the airstream of the vehicle traffic. The energy conversion unit according to the present disclosure can also be referred to as a traffic energy recovery unit. By means of the energy conversion unit the energy used for driving vehicles, such as motor vehicle, trains and aircraft is largely recovered. Thus previously unused energy can be made use of. Due to the high to very high wind speeds caused by air flows, which are caused by the movement of vehicles, the energy conversion unit can be operated with very high efficiency. At the same time, energy conversion units can be used in many possible ways by integrating them into the networks of traffic routes extending over large distances in industrial nations, i.e., road networks, railway lines and runways, etc. In some cases with respect to the use of electrically powered vehicles, as commonly found in rail transport and increasingly in road transport, the energy conversion unit makes it possible to provide a closed, emission-free energy cycle. Electrical energy which is used for powering a vehicle can be largely recovered by means of the energy conversion unit. By means of an energy conversion unit, energy conversion assembly or an energy conversion system it is possible to ensure the electrical self-sufficiency of a consumer, such as a railway station, an airport, a petrol station, an industrial plant, a hospital, or a plurality of residential buildings. In this way it is also possible to avoid laying long high-voltage lines from a remote location of a plant to the consumers. The acceptance of an energy conversion unit, which is to be arranged in the region of existing traffic routes, is expected to be many times greater than for conventional wind energy plants with the same capacity, as there is no need to encroach on woods and fields. As traffic noise is clearly significant on traffic routes and the energy conversion unit can even reduce noise levels there is no need for soundproofing. At the same time, the required investment and technical expertise are considerably lower than for conventional wind energy plants due to the simple implementation of the energy conversion unit. By using proven technology it is possible to ensure a long service life and relatively low maintenance requirements. Unlike wind turbines, the energy conversion unit is independent of a prevailing wind direction and does not require any adjustment with a change in wind direction, as the design can be adapted optimally to the conditions of the traffic route adjacent to the energy conversion unit.

To simplify reading, in the following description of expedient embodiments of the present disclosure, the same or similar reference signs are used for the same or similar components of different embodiments.

Hereinafter, an energy conversion unit according to the present disclosure is generally denoted by the reference sign 1. The energy conversion unit 1 comprises a wall 3 with a rotor 5 mounted thereon.

FIG. 1 shows the energy conversion unit 1 adjacent to a traffic route 21 for vehicles, which are represented here by way of example as a truck 23, a train 25 and an aircraft 27. The movement of the vehicles 23, 25, 27 in the direction of travel F causes an air flow L, which is referred to as an airstream. The air flow L acts on the rotor 5 and causes the latter to rotate about its axis of rotation D. The rotor 5 drives a power generator (not shown in more detail) for converting the kinetic wind or rotational energy into electrical energy.

The rotor 5 is mounted rotatably in a receptacle 31 in the wall 3 about the rotor axis D. The wall 3 has a side surface 33 directed towards the traffic route 21 with an opening 30 open to the receptacle 31. The air flow L blows through the opening 30 and drives the rotor 5.

Figure 2:
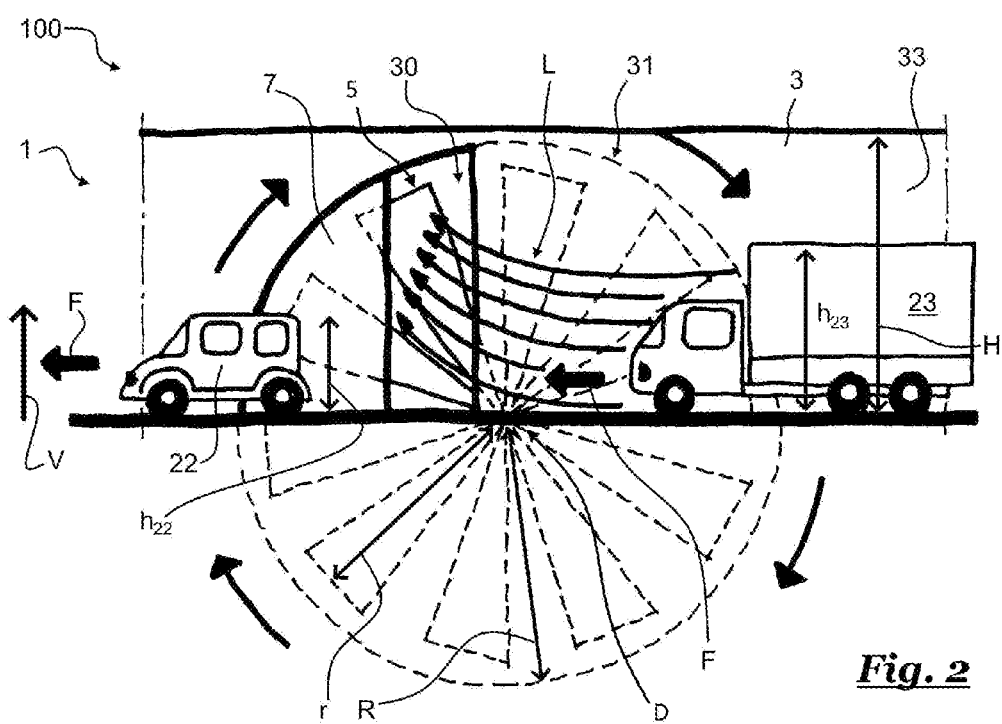
FIG. 2 is a schematic side view of another energy conversion unit according to the present disclosure.

FIG. 2 shows an energy conversion unit 1, which corresponds substantially to the schematic energy conversion unit 1 according to FIG. 1. In the embodiment shown in FIG. 2 a traffic route 21 is represented in the form of a road, which can be driven on by road vehicles, such as passenger cars 22 and trucks 23. The energy conversion unit 1 can form an energy conversion system 100 with the traffic route 21. The wall height H of the side surface 33 is larger than a passenger car height $h_{22}$ or a truck height $h_{23}$. The road traffic route 21 can be a motorway for example, which can be configured and arranged for driving on by trucks 23 which have a typical truck height $h_{23}$ of about 4 m.

The side surface 33 has a height H, which is greater than the height of the vehicles, which typically move on the traffic route 21. The wall 3 extends in the direction of travel F along the traffic route 21. Air flows L caused by the vehicles 22, 23 are held back by the long, high wall 3 and flow along the side surface 33. In front of the side surface 33 a tail box 7 is arranged on the wall. Air flows L flowing along the side surface 33 are guided through the tail box 7 to the opening 30. The opening 30 is in the form of a quarter circle and extends from the axis of rotation D in vertical direction V upwards and in the direction of travel F. The tail box 7 partly covers the opening 30.

The rotor 5 is rotatably mounted about an axis of rotation D in a receptacle 31 in the wall 3. The rotor 5 has an inflow direction, which is oriented parallel to the axis of rotation D. In the flow direction air inflows hitting the rotor 5 can drive the latter in an optimal manner. In the embodiment shown in FIG. 2 the rotor 5 has a rotor radius r, which corresponds almost to the height H of the wall. The receptacle 31 has a cylindrical form with an inner radius R, which corresponds substantially to the height H of the wall 3. The rotor radius r is slightly smaller than the inner radius R of the receptacle. In an expedient case the rotor radius r can be at least 90%, in some cases at least 95% of the inner radius R, so that practically no air can flow past the rotor 5 without being used. The axis of rotation D is arranged approximately on the same horizontal plane as the driving surface of the traffic route 21. A part of the receptacle 31 with the rotor 5 arranged therein is arranged in vertical direction V below the driving surface of the traffic route 21.

Figure 3:
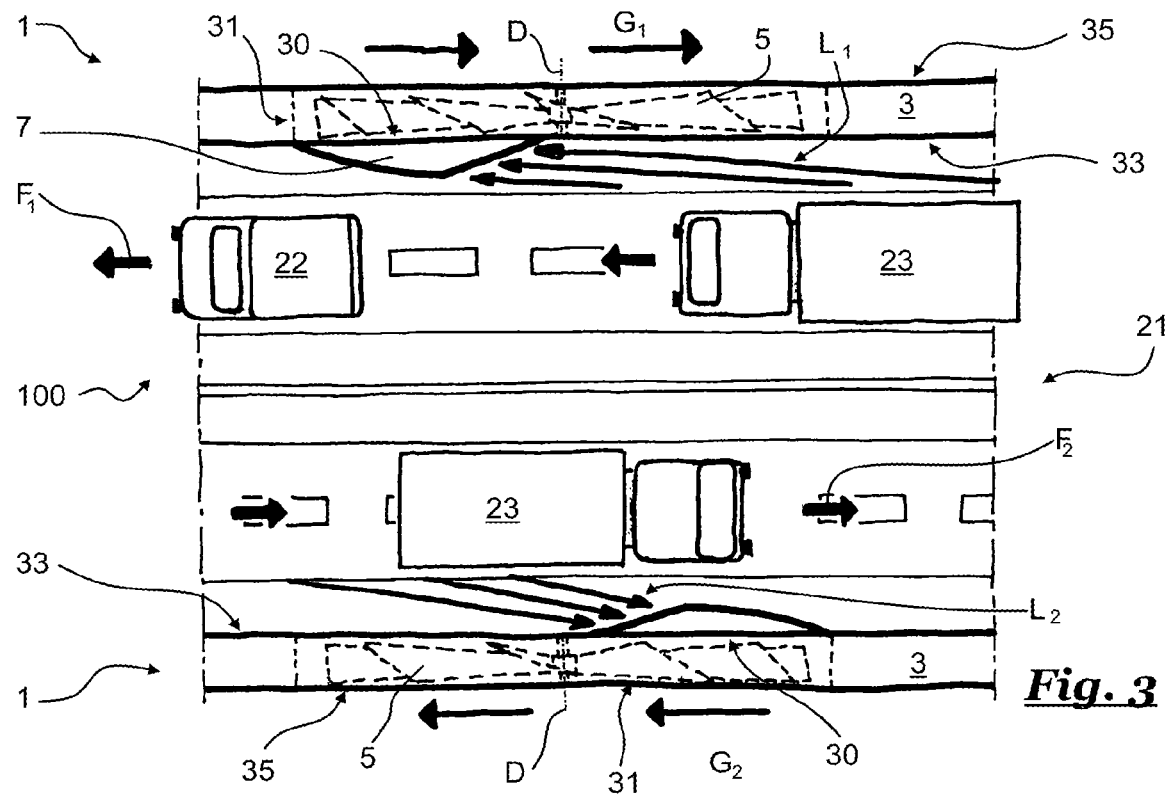
FIG. 3 is a schematic plan view of a multi-lane traffic route which is provided on both sides with an energy conversion unit.

FIG. 3 shows a plan view of a multi-lane road traffic route 21 with two lanes with opposite directions of travel $F_1$, $F_2$ of road vehicle 22, 23. The road traffic route 21 is surrounded on both sides by an energy conversion unit 1. The energy conversion units 1 and the road traffic route 21 can be seen as an energy conversion system 100. The vehicles 22, 23, which move in the first direction of travel $F_1$, generate a first airstream air flow $L_1$. The vehicles 23, which move in the second direction of travel $F_2$, generate a second airstream air flow $L_2$. The traffic route 21 is framed on both sides by energy conversion units 1. The airstream used by the energy conversion unit 1 does not remain on the road. It is discharged to the rear side 35, so that dissipation phenomena on the traffic route 21 are avoided. The energy conversion units 1 can be configured and operated as described above in relation to FIG. 2. The respective receptacle 31 extends perpendicular to the wall from the first side surface 33, which is directed towards the traffic route 21 to a rear side surface 35. The rotor 5 is accommodated fully inside the receptacle 31 and thus inside the wall 3. The axis of rotation D of the rotor 5 can, as shown in FIG. 2, be arranged perpendicularly, in some cases orthogonally, to the direction of travel F. The wall 3 has a small width B in the transverse direction in relation to the length and height H. The rotor width b is smaller than the wall width B.

Figure 4:
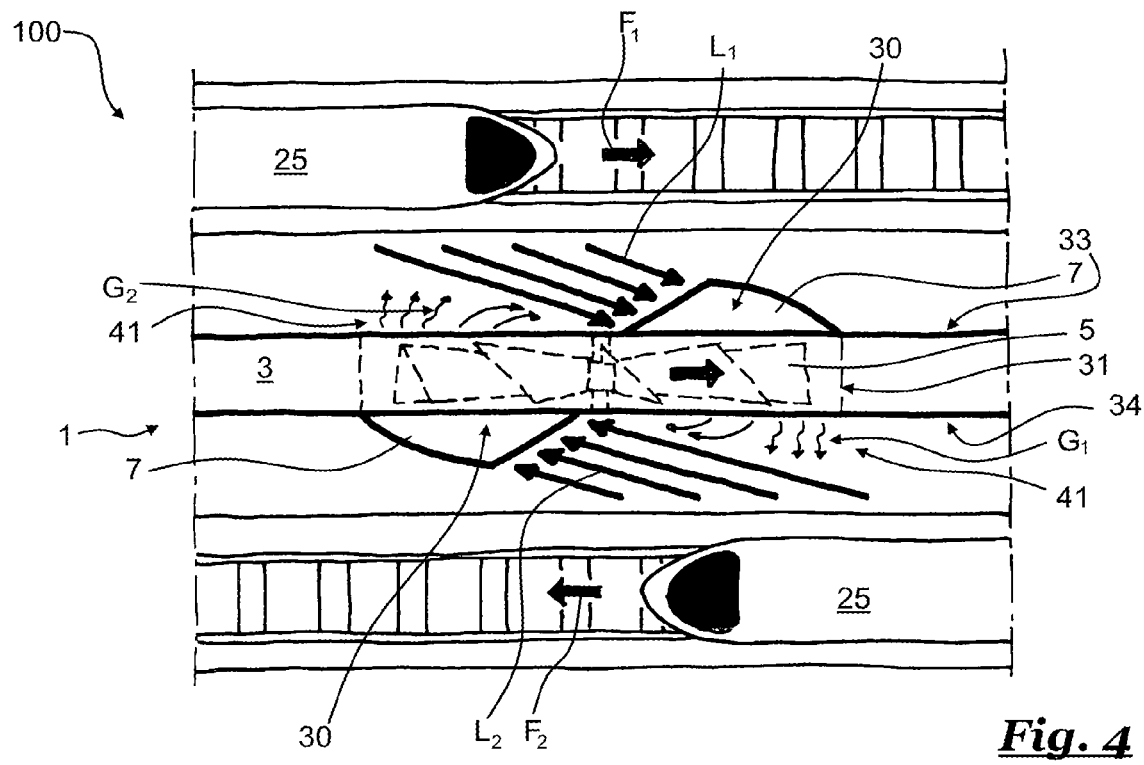
FIG. 4 is a schematic plan view of a multi-lane railway line, in which an energy conversion unit is arranged between the lanes.

FIG. 4 shows another embodiment of a multi-lane traffic route 21, which is represented here as a rail route, an energy conversion unit 1 being arranged between the tracks. It should be understood that alternatively another traffic route, such as a road, can be provided on both sides of the energy conversion unit 1 arranged centrally between the lanes. As shown in FIG. 4, it may be expedient that an energy conversion system 100 is configured such that the energy conversion unit 1 is arranged between the lanes of a traffic route 21 with opposing directions of travel $F_1$, $F_2$. Such an energy conversion unit can be configured such that the receptacle 31 has openings 30 on both opposite side surfaces 33, 34. The vehicles moving in the respective direction of travel $F_1$ or $F_2$, here high-speed trains 25, cause a respective airstream-air flow $L_1$, $L_2$. The air flow $L_1$, $L_2$ is guided to the rotor 5 through the first or second side surface 33 or 34 and the respective tail box 7 arranged thereon. After flowing through the rotor 5 a residual air flow $G_1$, $G_2$ can exit through the gap or grid openings in a negative pressure area 41. In the negative pressure area 41 the outflowing residual air flow G or $G_2$ of the first or second air flow $L_1$ or $L_2$ is carried along by the respective other, second or first air $L_2$ or $L_1$ acting thereon and forced back into the tail box 7. In this way, the efficiency of the energy conversion system 100 can be optimized.

Figure 5A:
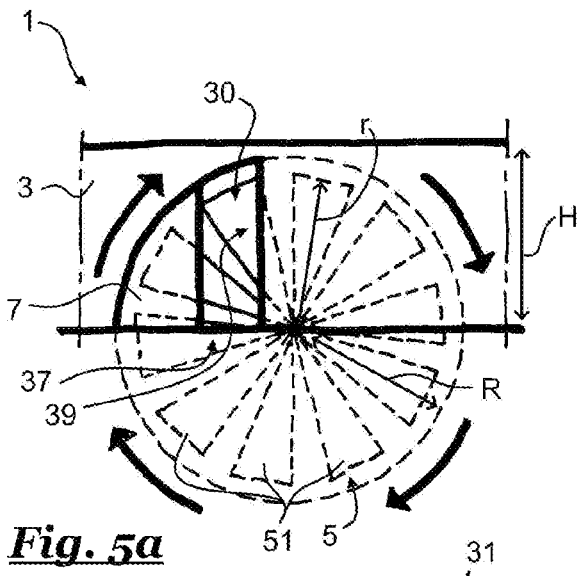
FIG. 5*a* is a schematic side view of an energy conversion unit according to FIG. 1 or 2.
Figure 5B:
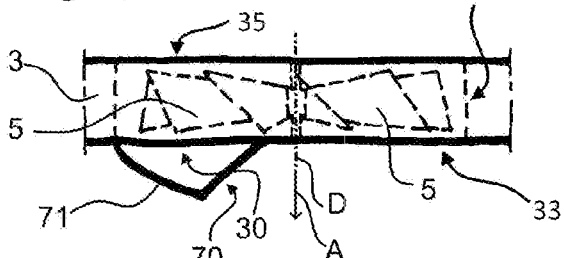
FIG. 5*b* is a plan view of the energy conversion unit according to FIG. 5*a*.

FIGS. 5a and 5b show an embodiment of an energy conversion unit 1, which in one of the aforementioned embodiments can be used according to FIGS. 1 to 4 described above. The rotor 5 has ten rotor blades 51, which rotate about the common axis of rotation D. The axis of rotation D is oriented to be horizontal. The axis of rotation D lies substantially on a horizontal plane of the ground, which can correspond for example to a driving surface of a traffic route. The rotor 5 is accommodated in a receptacle 31 inside the wall 3. The wall 3 is delimited by a first side surface 33 which is oriented towards a traffic route, for example parallel thereto. On the side opposite to the first side surface 33 the wall 3 is delimited by a rear side surface 35. The rotor width b of the rotor 5 is smaller than the width B of the wall 3. On the rear side 35 of the wall gap or grid openings can be provided so that an air flow which has been used for driving the rotor 5 can leave the receptacle 31 as residual air flow.

The side surface 33 is penetrated by an opening 30 through which the air flow can flow inside the receptacle 31 and to the rotor 5 arranged there. In the embodiments according to FIG. 5a this opening 30 is part-circular and extends along the round circumference of the receptacle 31 by about 80°. The opening 30 is limited at its lower end in vertical direction V by a horizontal lower edge 37. A side edge 39, which extends from the ground surface B parallel to the vertical direction V, delimits the other side of the opening 30. The height H of the side surface 33 or the wall 3 lies in the range between 120% and 150% of the rotor radius r.

A tail box 7 protrudes from the side surface 33 in a direction which corresponds to the axial direction A of the axis of rotation D. The tail box 7 has a tail box opening 70. An air flow enters the tail box 7 through the tail box opening 70 and is guided through the tail box 7 to the opening 30. The tail box extends along the circumferential edge of the opening 30 and is in close contact with the wall 3 there. The tail box 7 is formed in the simple embodiment depicted here by a simple guide plate 71.

Figure 6A:
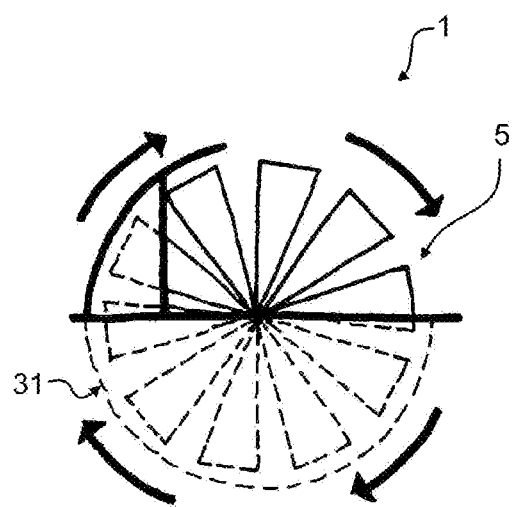
FIG. 6*a* is a schematic side view of an open energy conversion unit.
Figure 6B:
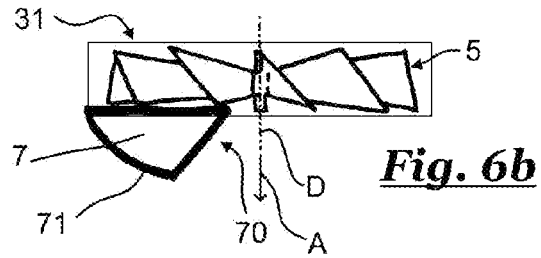
FIG. 6*b* is a plan view of the open energy conversion unit according to FIG. 6*a*.

FIGS. 6a and 6b show an alternative embodiment of an energy conversion unit 1. The rotor 5 is configured as in the previously described energy conversion unit 1 according to FIGS. 5a and 5b. A side surface arrange above the ground surface B is not provided. The receptacle 31 (and accordingly the wall) in the embodiment according to FIGS. 6a and 6b is formed underground, in some cases below the ground surface B. Above the ground surface B a tail box 7 is provided consisting of a guide plate 71. The tail box can divert the air flow, which blows transversely to the axis of rotation D and the corresponding inflow direction of the rotor 5, and guide it towards the rotor 5.

Figure 7:
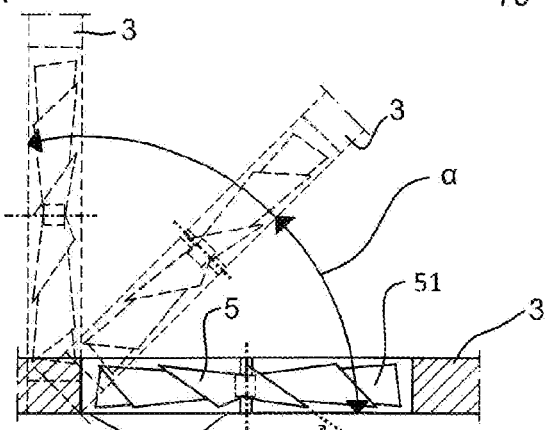
FIG. 7 is a schematic plan view of an angle adjustable energy conversion unit.

FIG. 7 shows schematically an energy conversion unit 1, which can be configured with or without a tail box 7, which can be arranged at different working angles in some cases in relation to a traffic route. As shown here schematically, the energy conversion unit 1 can be aligned to be parallel to a traffic route, so that the axis of rotation D is arranged in horizontal direction and perpendicular to the direction of travel, in this case it can be a working angle of 0°. It is possible that the energy conversion unit 1, i.e., the wall 3 with the rotor 5 arranged therein can be adjusted through any working angle α. The working angle α can be in the range of 30° to 45° for example.

With reference to the embodiment in FIG. 7 it should also be mentioned that the rotor blades 51 of the rotor 5 can be variable in their design. On the one hand the number of the rotor blades 51 can be selected to be variable with regard to the air flow anticipated at the place of use of an energy conversion unit 1. Furthermore, the size, i.e., the rotor radius r and/or the rotor width b can be selected optimally with respect to the anticipated flow conditions. Furthermore, the angle of inclination δ of the rotor blades 51 can be adjusted variably with respect to the axis of rotation D. In an expedient case, the angle of inclination δ can be adjustable in the range of 5° to 85°, in some cases in the range of 10° to 80°, in an expedient case in the range of 30° to 60°. The angle of inclination δ can be set to be constant by structure. It is possible that the rotor 5 comprises an adjusting device, which is configured and arranged to optimally adjust the angle of angle of inclination δ of the rotor blades 51 with respect to the axis of rotation D in relation to the existing flow conditions in the place of use of the energy conversion unit 1.

Figure 8:
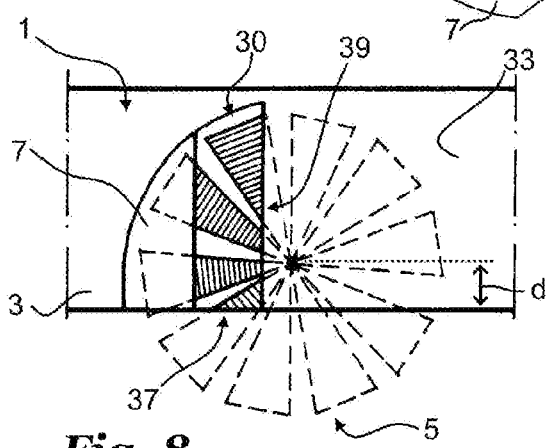
FIG. 8 is a schematic side view of a further energy conversion unit.

FIG. 8 shows a further embodiment of an energy conversion unit similar to the one described above with reference to FIGS. 5a and 5b. Unlike the previously described energy conversion units the axis of rotation D of the rotor 5 is arranged at a distance above the ground surface B. Rotational axis D extends in horizontal direction. The lower edge 37 and the side edge 39 of the opening 30 in the side surface 33 of the wall 3 are configured to be very similar to the opening 30 described with reference to FIG. 5a, the difference being that the curved edge and the side edge 39 are extended downwards in vertical direction V and extend below the axis of rotation D to the ground surface B. The distance d of the axis of rotation D to the ground surface B is smaller than the rotor radius r. In the embodiment in FIG. 7 the distance d is smaller than half the rotor radius r.

Figure 9:
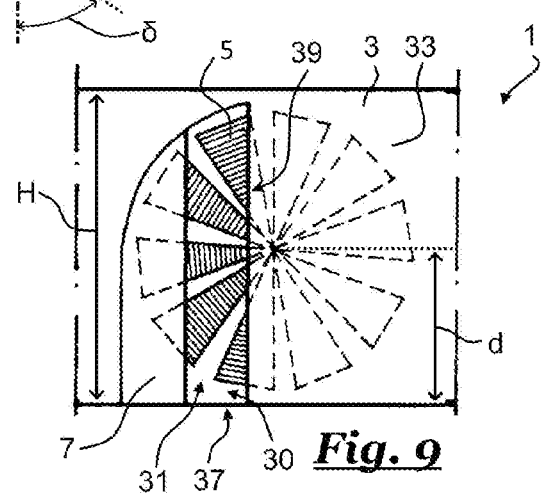
FIG. 9 is a schematic side view of another energy conversion unit.

FIG. 9 shows a further embodiment of an energy conversion unit, which corresponds substantially to the embodiment according to FIG. 8. However, the distance d between the axis of rotation D and the ground surface B is greater than the rotor radius r. The receptacle 31 and the rotor 5 located therein are arranged completely above the ground surface B. The distance d of the axis of rotation D to the ground surface B corresponds substantially to the inner radius R of the receptacle 31. The height H of the side surface 33 or the wall 3 lies in the range between 220% and 250% of the rotor radius r.

Figure 10:
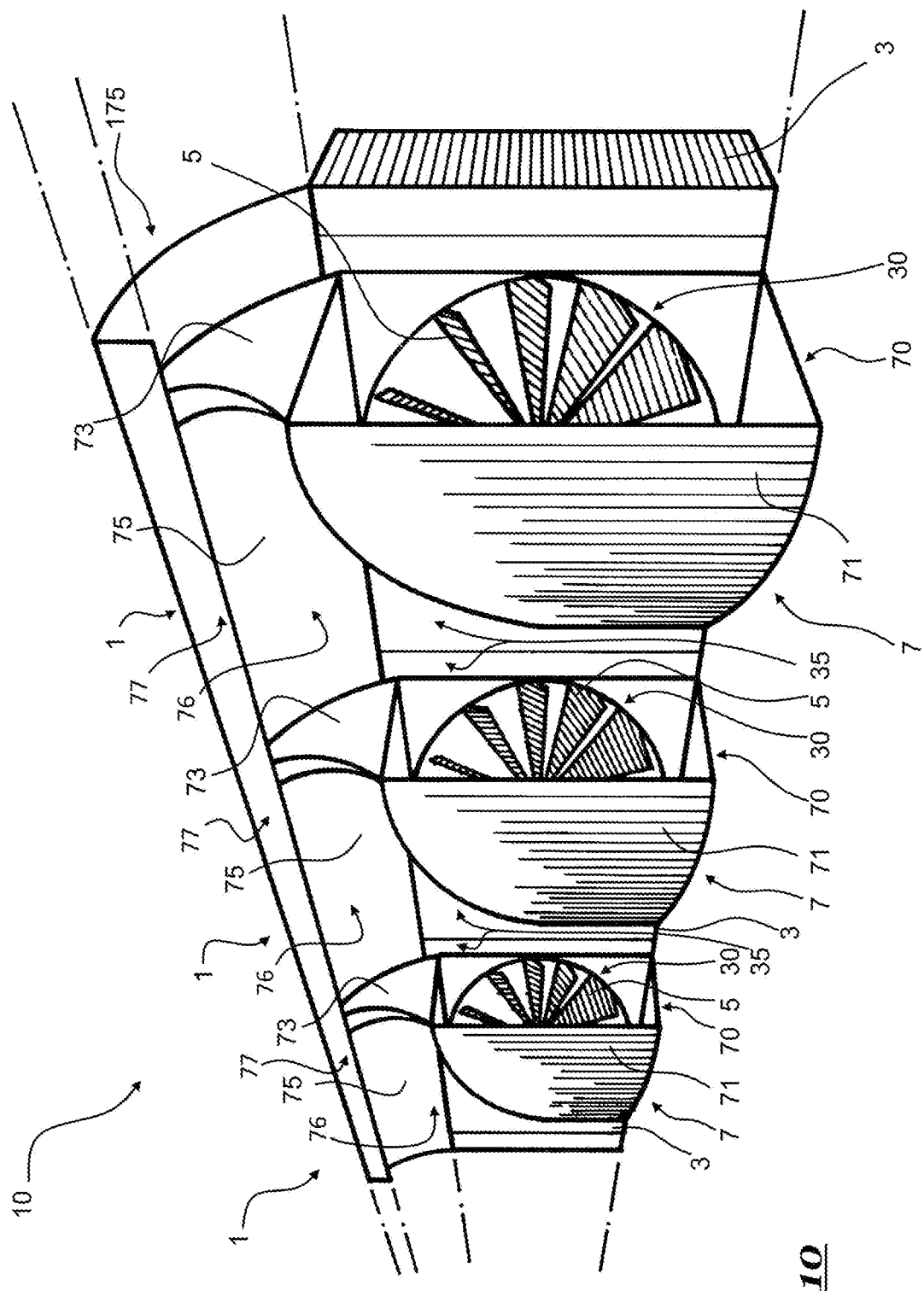
FIG. 10 is a perspective view of an energy conversion assembly with three energy conversion units according to FIG. 9.

FIG. 10 shows an energy conversion assembly 10 of a plurality of energy conversion units 1 similar to the energy conversion unit shown in FIG. 9. The energy conversion units 1 are structurally identical. The side surfaces 35 of the wall sections 3 merge into one another in a planar parallel manner.

At the upper edge of each wall section 3 respectively a deflector plate 75 is arranged. It should be noted that the deflector plates (as with the aforementioned guide plates) do not need to be made from a metal material. The deflector plate 75 projects from the side surface 35 in the direction of the traffic route 21. The deflector plate 75 can be generally oblique, i.e., have a vertical component and a horizontal component in its extension with respect to the wall 3. In some cases, the deflector plate 75 is curved and has, as shown in FIG. 10, a concave curvature with respect to the flat side surface 33. On the longitudinal edge of the deflector plate 75 facing the traffic route 21 a bend 77 is provided projecting downwards in vertical direction V.

A tail box 7 is provided in front of each opening 30 of the energy conversion units 1. The tail box extends in the direction of travel over the entire diagonal width of the opening 30. The opening 30 is circular in the embodiment depicted here and corresponds to the inner radius R of the receptacle 31.

The tail box 7 is formed by a guide plate 71 which is curved concavely against the direction of travel. The guide plate 71 extends in vertical direction V substantially over the entire height of the opening 30 and covers the axis of rotation D in its axial direction A. The guide plate 71 extends in vertical direction from the ground surface B, on which the wall 3 stands, up to the upper edge of the opening 30.

In order to force air flows, which flow along the deflector plate 75 towards the opening 30 an apron 73 is provided above the guide plate 71, which extends flat between the inner side 76 of the deflector plate 75 and the upper edge of the tail box 7. The apron 73 is pivoted or curved at least partly against the direction of travel to provide an aerodynamically advantageous guiding of the air flow from the deflector plate 75 into the tail box 7. The side surfaces 35 and the deflector plates 75 of adjacent wall sections 3 are aligned relative to one another in a plane-parallel manner and merge into one another without gaps. The energy conversion assembly 10 provides by the cooperation of the deflector plates 75, the aprons 73, as well as the tail box 7 and side surfaces 35 a large area for catching and guiding airstream-air flows L to the rotor 5 for example.

Figure 11:
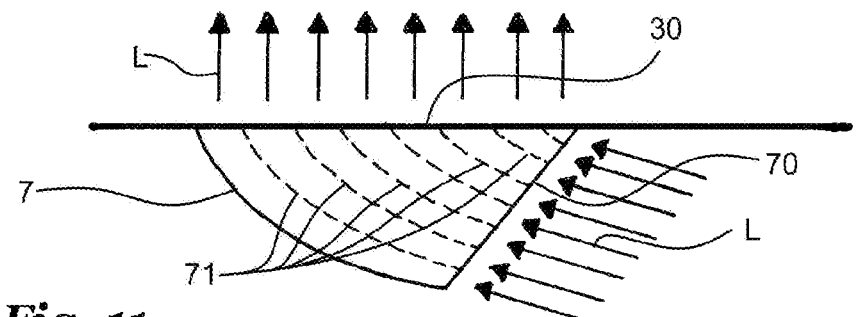
FIG. 11 is a detailed view of a tail box.

FIG. 11 shows an example of a tail box 7 with a plurality of guide plates 71. The guide plates 71 form substantially parallel flow channels for the air flow L from the tail box opening 70 to the opening 30, so that there is an opening 30 of the receptacle 31 corresponding to an orientation of the air flow L to the inflow direction of the rotor (not shown in detail). The number of guide plates 71 in a tail box 7 can be for example between 2 and 100, in some cases between 5 and 20.

Figure 12:
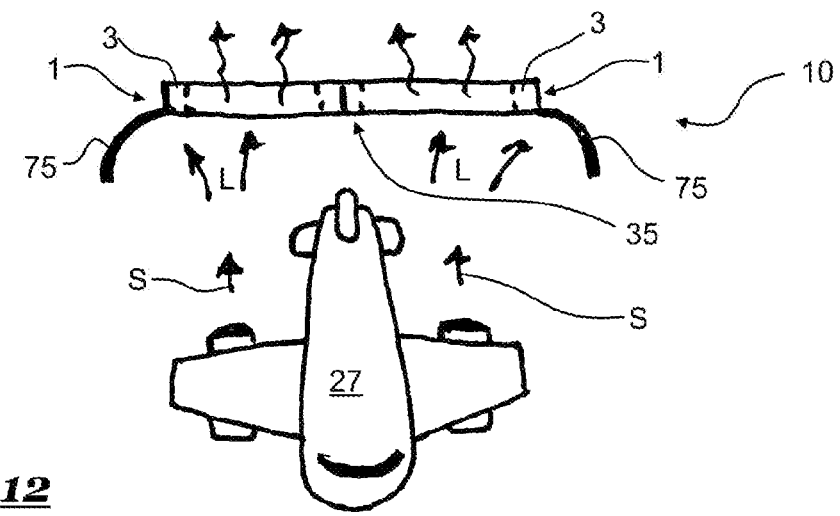
FIG. 12 is a schematic plan view of an energy conversion assembly with two energy conversion units, to which the thrust flow of an aircraft is directed.

FIG. 12 shows a further embodiment of another energy conversion assembly 10, which is composed of 2 energy conversion units 1. In the energy conversion assembly 10 shown in FIG. 12 or the energy conversion units 1 the axis of rotation D of the rotor (not shown in detail) is oriented parallel to a direction of travel of a traffic route for aircraft 27 in the form of a runway, in some cases for landing and/or taking off. The thrust flow S of the jets or propellers of the aircrafts 27 is oriented according to the inflow direction of the rotors. According to one embodiment the energy conversion assembly 10 can be arranged to be stationary at the end of a runway, in some cases a take-off and/or landing strip. According to an expedient embodiment the energy conversion assembly 10 can be provided with a support carriage, which enables it to follow the aircraft 27 at a predetermined distance a, so that the energy conversion assembly 10 remains as long as possible at an advantageous distance from the jets or propellers of the aircraft 27. On the opposite end edges of the wall sections 3 of the energy conversion assembly 10 concavely protruding deflector plates 75 can be arranged. In addition or alternatively, a deflector plate or a deflector plate section can be arranged on the upper edge of the wall sections 3. The traffic route in the form of a runway with the energy conversion assembly 10 can be for example like a runway of a civilian airport, a military airport or an aircraft carrier vessel.

At the jet output of the aircraft 27 a thrust flow S may have a velocity of about 1000 m/s. The air flow L which has reached the rotor of the energy conversion unit 1, has, due to the assembly of the energy conversion unit 1 at the predetermined distance a from the aircraft 27, a velocity v in the range between approximately 300 km/h and 400 km/h (corresponds to approximately 83 m/s to 111 m/s). For each start-up of an aircraft 27 the energy conversion assembly 10 can be held at the predetermined distance a for a duration t of about 10 seconds. With a rotor radius r of about 7.5 m the cumulative rotor area ($A_{10} = 2 * \pi * r^2$) is about 353 m². Due to the optimal configuration of the rotors with regard to the flow characteristics a power extraction (c) from the air flow L of about 59% can be assumed. A large airport, such as the airport in Frankfurt am Main has about 256,950 aircraft take-offs per year (N). The electrical yield E of the energy conversion assembly 10 is calculated using the formula:

$$E = \frac{1}{2} * c * \rho * A_{10} * v * N * t$$

wherein ρ=1.2,
a yield between about 50,928 MWh per year (for v=83 m/s) and 121.812 MWh (for v=111 m/s) per year, which is sufficient for supplying from 14,000 up to 30,000 households with a household consumption of about 3,500 kWh per year. This corresponds to the output of about 15 to 35 conventional "3 MW wind power plants."

Figure 13:
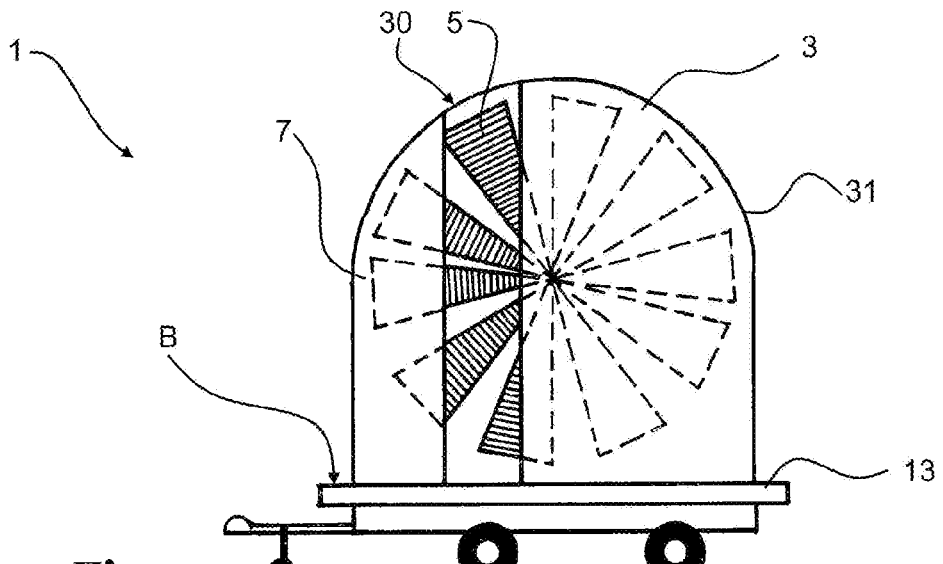
FIG. 13 is an embodiment of an energy conversion unit with a support carriage.

FIG. 13 shows an energy conversion unit 1, in which the wall 3 is formed by a shuttering made of sheet metal for example, which has an opening 30 and a tail box 7 arranged in front of the opening 30. The energy conversion unit 1 further comprises a trailer 13 with rolling tires, which is configured and arranged as a support carriage, in order to make the energy conversion unit 1 mobile and transportable. The trailer 13 can be attached for example to the trailer coupling of a truck in order to be transported to a place of use. The wall 3 with the receptacle 31 formed therein and the rotor 5 held in the receptacle is secured to the support surface of the trailer 13 which forms the base surface B. The opening 30 is partially circular and/or square and extends on one side of the axis of rotation from the base surface to the upper edge of the wall 3.

Figure 14:
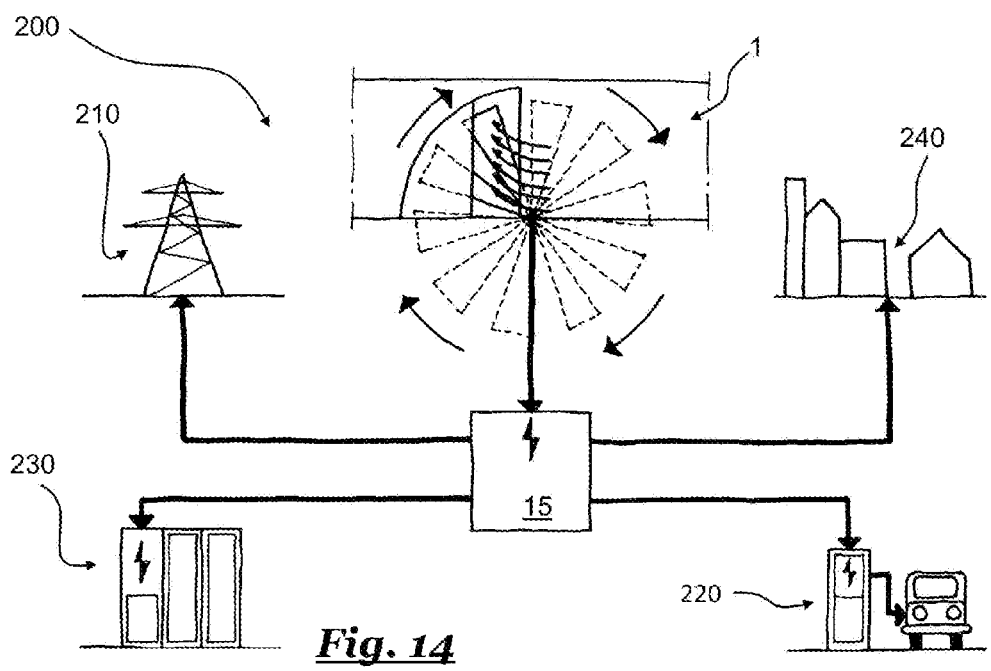
FIG. 14 is a schematic representation of a network with an energy conversion unit.
Figure 15:
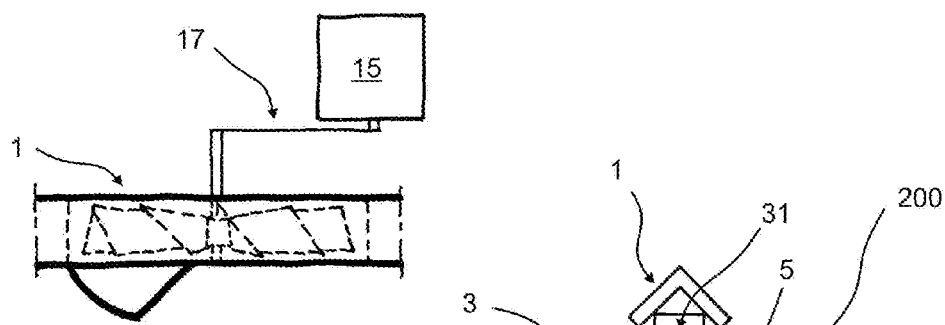
FIG. 15 is a plan view of an energy conversion unit with a generator.

FIG. 14 depicts a network 200 that comprises an energy conversion unit 1. The energy conversion unit 1 can be designed for example as described above with reference to FIG. 5a. It is clear that the network 200 can optionally have a plurality of energy conversion units 1. The energy conversion unit 1 is connected to the power generator. A power generator can be for example a generator 15, which is attached directly to the shaft which supports the rotor 5. As shown in the schematic plan view according to FIG. 15, it is possible alternatively that the output shaft of the rotor 5 is connected to the drive shaft of the power generator 15 via transmission and/or translation means 17, such as a chain, a belt, a gear wheel or the like. From the power generator 15 the electrical energy generated by the energy conversion unit 1 can be fed into the public power grid 210. Alternatively or additionally it is possible that the power generator 15 is connected to an energy storage device, such as a battery 230, in order to store the electrical energy generated by the energy conversion unit 1. Furthermore, it is possible that the power generator is connected to a charging station 220 for a vehicle, for example a road vehicle, such as a passenger car 22. Alternatively or additionally the power generator 15 can be connected to a network of a building or a building complex 240, such as an airport, a hospital, a petrol station, one or more residential buildings, or the like, in order to supply them with electrical energy.

Figure 16:
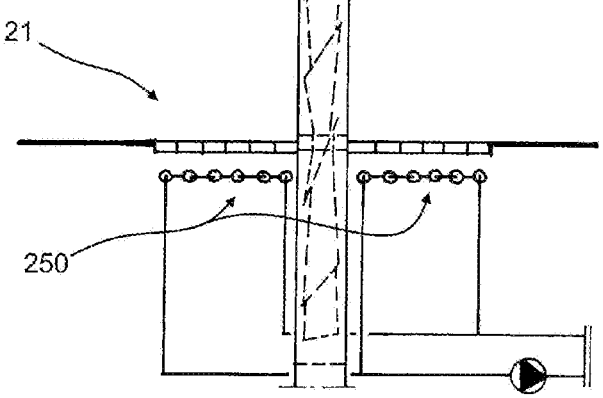
FIG. 16 is a schematic cross-sectional view of an energy conversion system with heating device.

FIG. 16 shows an alternative configuration of a network 200, wherein the energy conversion unit 1, which can be realized for example according to the embodiment described above with reference to FIG. 3, is connected to a consumer in the form of a heating device 250 for keeping the traffic route 21 free of frost and/or at least one access path of the energy conversion unit 1. Alternatively or additionally an energy conversion unit 1 or an energy conversion assembly can be connected in a network 200 with induction coils in a traffic route 21 for charging electrically powered vehicles driving on the traffic route 21 so as to supply them with electrical energy while driving.

The features of the present disclosure disclosed in the above description, the claims and the drawings can be essential both individually and in any combination for implementing the present disclosure in its various embodiments.

The various embodiments described above can be combined to provide further embodiments. All of the U.S. and foreign patents and patent application publications referred to in this specification and/or listed in the Application Data Sheet are incorporated herein by reference, in their entirety. Aspects of the embodiments can be modified, if necessary to employ concepts of the various patents and patent application publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An energy conversion unit for converting wind energy into electrical energy, comprising:
   at least one rotor with a substantially horizontal axis of rotation (D), comprising a plurality of rotor blades extending radially to the axis of rotation (D), wherein the rotor has an inflow direction which corresponds to the axis of rotation (D);
   a wall to be arranged next to a traffic route for vehicles which can move on the traffic route in a direction of travel (F) and whose movement causes an air flow (L), wherein the wall has a receptacle in which the rotor is arranged, wherein the receptacle has an opening on a side surface of the wall to be directed towards the traffic route, and wherein the axis of rotation (D) of the at least one rotor is oriented substantially perpendicular to the direction of travel (F);
   a tail box for guiding the air flow to the opening, wherein the tail box is mounted on the side surface of the wall facing towards the traffic route and is situated in front of the wall in axial direction to the axis of rotation (D), wherein the tail box comprises a tail box opening directed against the direction of travel (F), wherein the tail box is otherwise closed off from the traffic route or wherein the tail box comprises at least one guide plate for guiding the air flow (L) from the tail box opening to the opening of the receptacle; and
   at least one apron arranged above the tail box opening from the tail box opening opposite the direction of travel (F), which apron is configured and arranged to guide the air flow (L) to the opening of the receptacle.

2. The energy conversion unit according to claim 1, wherein:
   the wall has a main direction of extension, wherein the main direction of extension corresponds to the direction of travel (F) or wherein the main direction of extension is oriented perpendicularly to the axis of rotation (D) of the at least one rotor.

3. The energy conversion unit according to claim 1, wherein the least one apron arranged above the tail box opening is projecting obliquely from the tail box opening opposite the direction of travel.

4. The energy conversion unit according to claim 1, wherein the tail box at least partly surrounds the opening, wherein the tail box covers the axis of rotation (D), or wherein, in the vertical direction (V), the tail box extends at least as high as the opening of the receptacle.

5. The energy conversion unit according to claim 1, wherein the axis of rotation (D) of the rotor is oriented perpendicularly to the side surface of the wall.

6. The energy conversion unit according to claim 1, wherein the opening is part-circular.

7. The energy conversion unit according to claim 1, wherein the opening extends above the traffic route or wherein the receptacle is arranged at least partly below the traffic route.

8. The energy conversion unit according to claim 1, further comprising:
   at least one deflector plate which extends on an upper or side edge along the wall and projects obliquely in the direction of the traffic route from the side surface.

9. The energy conversion unit according to claim 8, wherein the at least one deflector plate has a bend projecting downwards in vertical direction at an edge facing the traffic route.

10. An energy conversion assembly comprising a plurality of energy conversion units according to claim 1, wherein the walls of the plurality of energy conversion units form a system wall and have side surfaces which are aligned with one another.

11. An energy conversion system, comprising at least one energy conversion unit according to claim 1, wherein the wall runs adjacent to the traffic route, at least in sections.

12. The energy conversion system according to claim 11, wherein:
   the traffic route is a first traffic route and the energy conversion unit is arranged between the first traffic route and a second traffic route,
   wherein the opening on the side surface is a first opening on a first side surface of the wall which is directed towards the first traffic route, and
   wherein the receptacle has a second opening on a second opposite side surface of the wall which is directed towards the second traffic route.

13. A network comprising the energy conversion unit according to claim 1, further comprising:
   at least one electrical consumer or at least one access path of the energy conversion unit,
   at least one electrical charging station for at least one vehicle,
   at least one induction coil arrangement for inductively charging a vehicle located on the traffic route,
   at least one power storage unit, and
   at least one converter device for feeding the electrical energy into a power grid.

\* \* \* \* \*